US012808452B2

(12) United States Patent
Sun

(10) Patent No.: US 12,808,452 B2
(45) Date of Patent: Nov. 24, 2026

(54) POWER CYLINDER WITH EMBEDDED SOLENOID VALVE

(71) Applicant: CHEN SOUND INDUSTRIAL CO., LTD., Taichung City (TW)

(72) Inventor: Ying Sun, Taichung City (TW)

(73) Assignee: CHEN SOUND INDUSTRIAL CO., LTD., Taichung City (TW)

( * ) Notice: Subject to any disclaimer, the term of this patent is extended or adjusted under 35 U.S.C. 154(b) by 175 days.

(21) Appl. No.: 18/503,214

(22) Filed: Nov. 7, 2023

(65) Prior Publication Data

US 2025/0146592 A1 May 8, 2025

(30) Foreign Application Priority Data

Nov. 30, 2022 (TW) ................................. 111145872

(51) Int. Cl.

| | |
|---|---|
| ***F16K 27/04*** | (2006.01) |
| ***F15B 15/14*** | (2006.01) |
| ***F15B 15/20*** | (2006.01) |
| ***F16K 31/06*** | (2006.01) |
| *F16K 47/02* | (2006.01) |

(52) U.S. Cl.

CPC ........ *F16K 31/0613* (2013.01); *F15B 15/149* (2013.01); *F15B 15/202* (2013.01); *F16K 27/041* (2013.01); *F16K 47/02* (2013.01)

(58) Field of Classification Search

CPC ............... F16K 31/0613; F16K 27/041; F15B 2013/041; F15B 13/044; F15B 15/1433; F15B 15/149; F15B 15/202; F15B 15/1423

See application file for complete search history.

(56) References Cited

U.S. PATENT DOCUMENTS

| | | | | |
|---|---|---|---|---|
| 2,976,852 A * | 3/1961 | Goldring | F15B 13/0402 | 91/32 |
| 2005/0022660 A1* | 2/2005 | Holland | F15B 15/202 | 91/435 |
| 2005/0139274 A1* | 6/2005 | Patel | F15B 13/0875 | 137/625.64 |
| 2009/0007771 A1* | 1/2009 | Matsumoto | F15B 15/202 | 91/462 |
| 2020/0088309 A1* | 3/2020 | Kono | F16F 1/047 | |

* cited by examiner

*Primary Examiner* — Kelsey E Cary

(74) *Attorney, Agent, or Firm* — MUNCY, GEISSLER, OLDS & LOWE, P.C.

(57) ABSTRACT

A power cylinder with embedded solenoid valve includes a cylinder body having a chamber, a piston assembly in the chamber, a top cover and a bottom cover on two ends of the cylinder body, and a solenoid valve disposed on the top cover. The top cover includes an inlet, two outlets, a movement bore, a first passage, and a second passage. The inlet and the two outlets are connected with the movement bore, allowing a fluid to enter the chamber. The bottom cover includes a third passage connected with the first passage and the chamber. A valve stem of the solenoid valve is disposed in the movement bore, reciprocating between a first and a second position for the fluid to push the piston assembly toward or away from the top cover. Thus, the solenoid valve and the power cylinder are integrated.

3 Claims, 7 Drawing Sheets

POWER CYLINDER WITH EMBEDDED SOLENOID VALVE

BACKGROUND OF THE INVENTION

1. Field of the Invention

The present invention relates to power cylinder structures, and more particularly, to a power cylinder with embedded solenoid valve which is able to effectively maintain the overall volume during usage.

2. Description of the Related Art

A conventional fluid pressure cylinder comprises a cylinder barrel, a piston movably contained in the cylinder barrel, and a piston shaft connecting the piston. Therein, during the actual operation, the conventional fluid pressure cylinder switches the supply and discharge of the pressurized fluid into or out of the cylinder chamber of the cylinder barrel through the operation of a solenoid valve, and the pressurized fluid accordingly controls the reciprocation of the piston and the piston shaft.

However, the base of the solenoid valve has to be attached to the surface (lateral side) of the cylinder barrel. Because the solenoid valve and other elements are attached to the surface of the cylinder barrel, the overall volume of the fluid pressure cylinder in actual use is significantly larger than the volume of it in the product form. Therefore, it is difficult for the user to know the needed installation space and the positional relationship of the fluid pressure cylinder with respect to other devices in advance, causing an inconvenience of usage.

Also, because the solenoid valve and the fluid pressure cylinder are two independent structures, when in use, the installation of the solenoid valve onto the fluid pressure cylinder usually takes a certain amount of time, causing an inconvenience of usage as well.

SUMMARY OF THE INVENTION

To improve the issues above, the present invention discloses a power cylinder with embedded solenoid valve. The solenoid valve is combined with the top cover of the power cylinder to maintain the overall volume during usage, thereby allowing the user to effectively arrange the installation space and improving the convenience of usage.

For achieving the aforementioned objectives, an embodiment of the present invention provides a power cylinder with embedded solenoid valve, comprising:

- a cylinder body having a first end and an opposite second end, the cylinder body also comprising a chamber therein;
- a piston assembly movably disposed in the chamber of the cylinder body;
- a top cover disposed on the first end of the cylinder body, the top cover having an inlet, two outlets, a movement bore, a first passage, and a second passage, the inlet and the two outlets being in communication with the movement bore, so that a fluid enters the chamber through the inlet, wherein a plurality of operation channels are concavely disposed at intervals on a periphery of an inner diameter of the movement bore, and the operation channels are in positional alignment and communication with the inlet, the two outlets, the first passage, and the second passage, respectively, and the second passage is in communication with the chamber;

- a bottom cover disposed on the second end of the cylinder body, the bottom cover comprising a third passage in communication with the first passage and the chamber; and
- a solenoid valve disposed on the top cover, the solenoid valve comprising an electronic control unit and a valve stem, the valve stem movably disposed in the movement bore, the electronic control unit controlling the valve stem to reciprocate between a first position and a second position, wherein when the electronic control unit controls the valve stem to be located at the first position, the inlet is in communication with two of the operation channels, the first passage, the third passage, and the chamber, and the fluid pushes the piston assembly toward the top cover; when the electronic control unit controls the valve stem to move to the second position, the inlet is in communication with other two of the operation channels, the second passage, and the chamber, and one of the two outlets is in communication with another one of the operation channels, the first passage, the third passage, and the chamber, and the fluid pushes the piston assembly away from the top cover, and the fluid originally located in the chamber is outputted from the outlet through the third passage and the first passage.

With such configuration, the solenoid valve is combined with the top cover, so that the solenoid valve does not need to be independently installed. Therefore, the volume of the power cylinder is not increased, allowing the user to effectively arrange the installation space.

Also, the power cylinder of the present invention is structurally simple, saving the need of additional time for installing the solenoid valve during actual use, thereby reducing the inconvenience of usage.

DETAILED DESCRIPTION OF THE INVENTION

Figure 1:
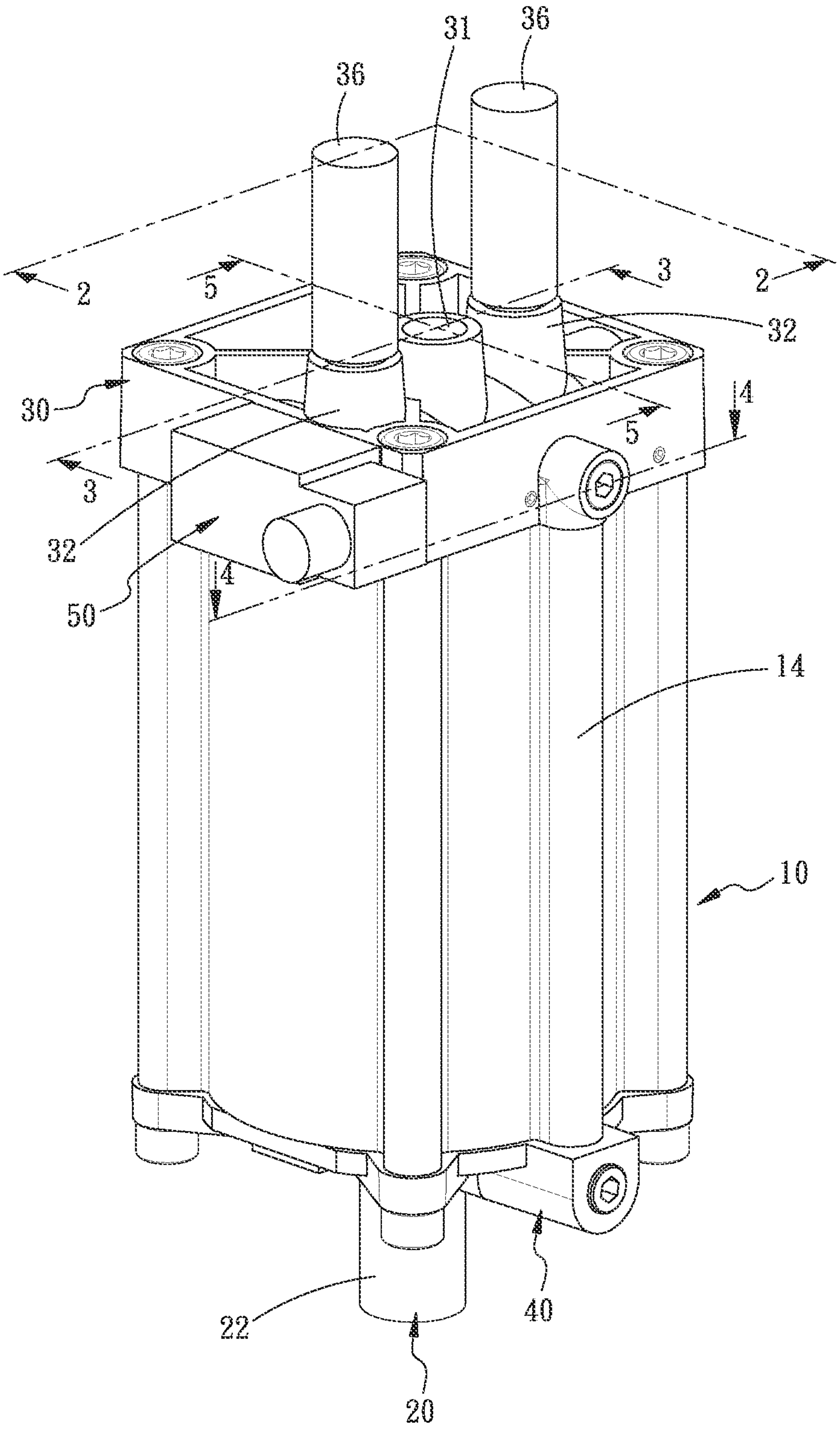
FIG. 1 is a perspective view of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 7, the present invention provides a power cylinder with embedded solenoid valve, comprising a cylinder body 10, a piston assembly 20, a top cover 30, a bottom cover 40, and a solenoid valve 50.

Figure 3:
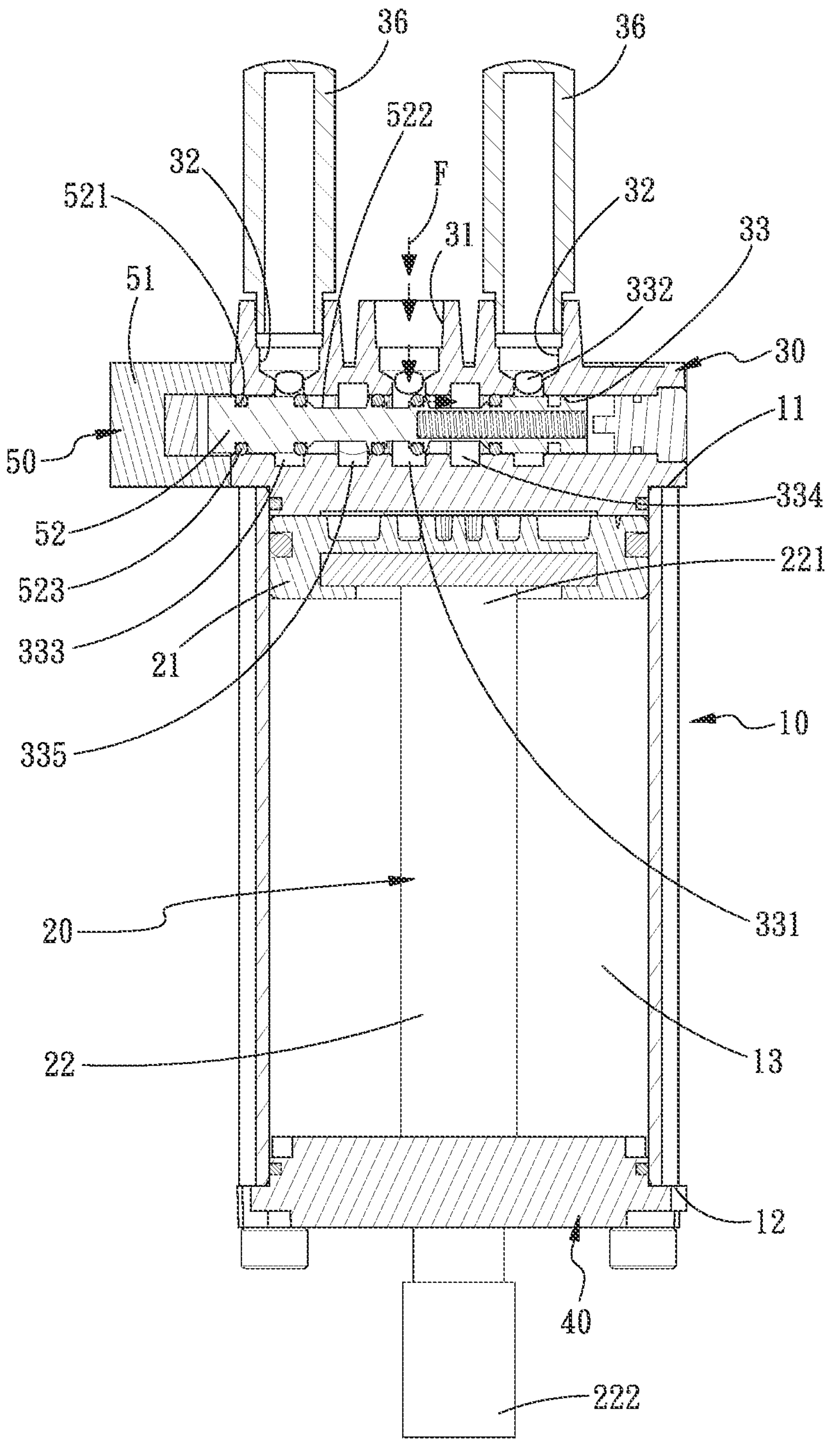
FIG. 3 is a cross-sectional view taken along line 3-3 in FIG. 1, illustrating the valve stem at the first position.

The cylinder body 10 comprises a first end 11, an opposite second end 12, and a chamber 13 disposed inside the cylinder body 10. Therein, the cylinder body 10 comprises a housing part 14 convexly disposed on an outer lateral side thereof. The housing part 14 comprises a flow channel 141 passing therethrough, as shown by FIG. 1 and FIG. 3.

The piston assembly 20 is movably disposed in the chamber 13 of the cylinder body 10. The piston assembly 20 comprises a piston 21 and a shaft body 22. The shaft body 22 comprises a first connection end 221 and an opposite second connection end 222. The piston 21 is disposed in adjacent to the first end 11 of the cylinder body 10. Therein, one side of the piston 21 is connected with the first connection end 221 of the shaft body 22. The second connection end 222 of the shaft body 22 protrudes out of the second end 12 of the cylinder body 10.

Figure 2:
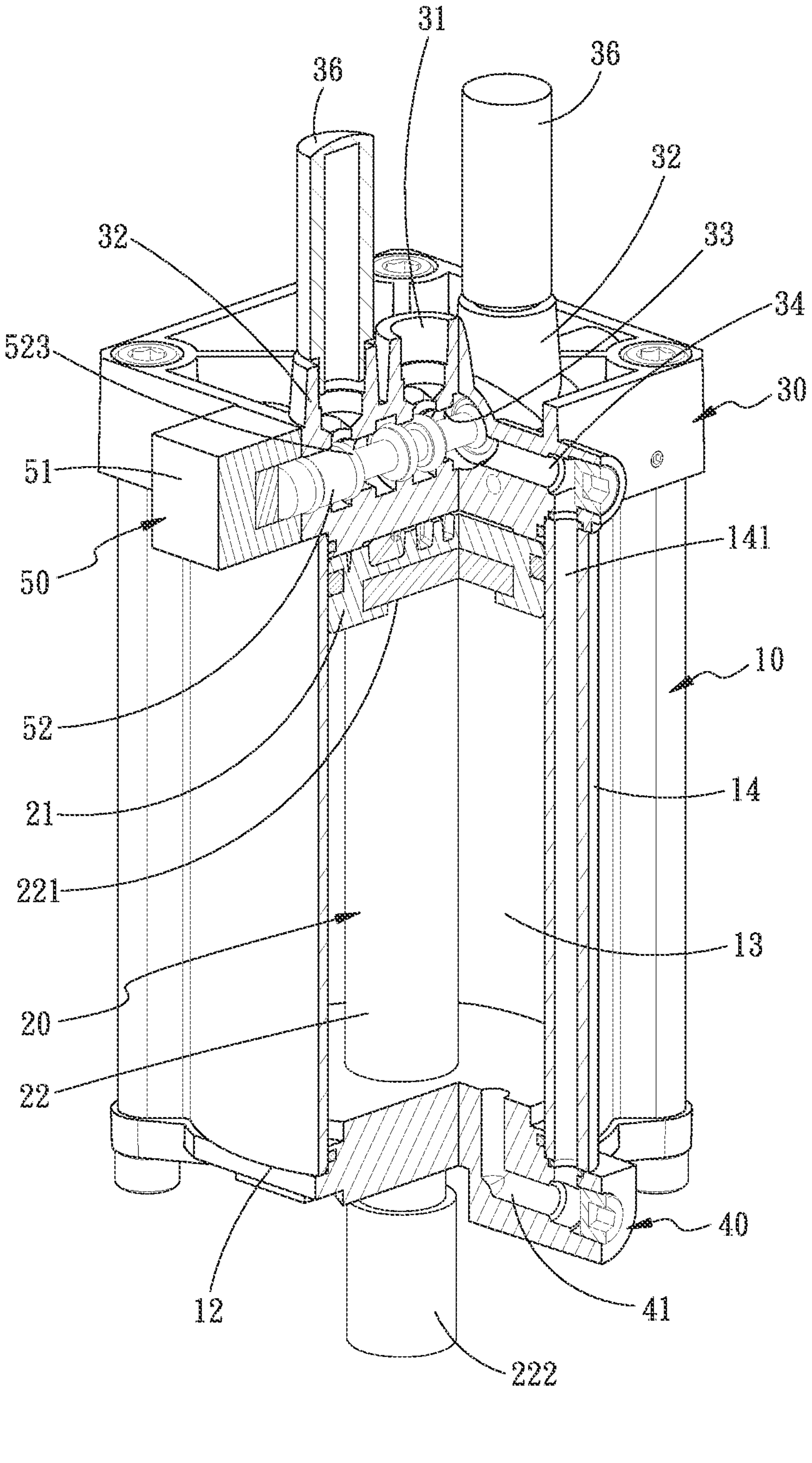
FIG. 2 is a cross-sectional view taken along line 2-2 in FIG. 1.
Figure 5:
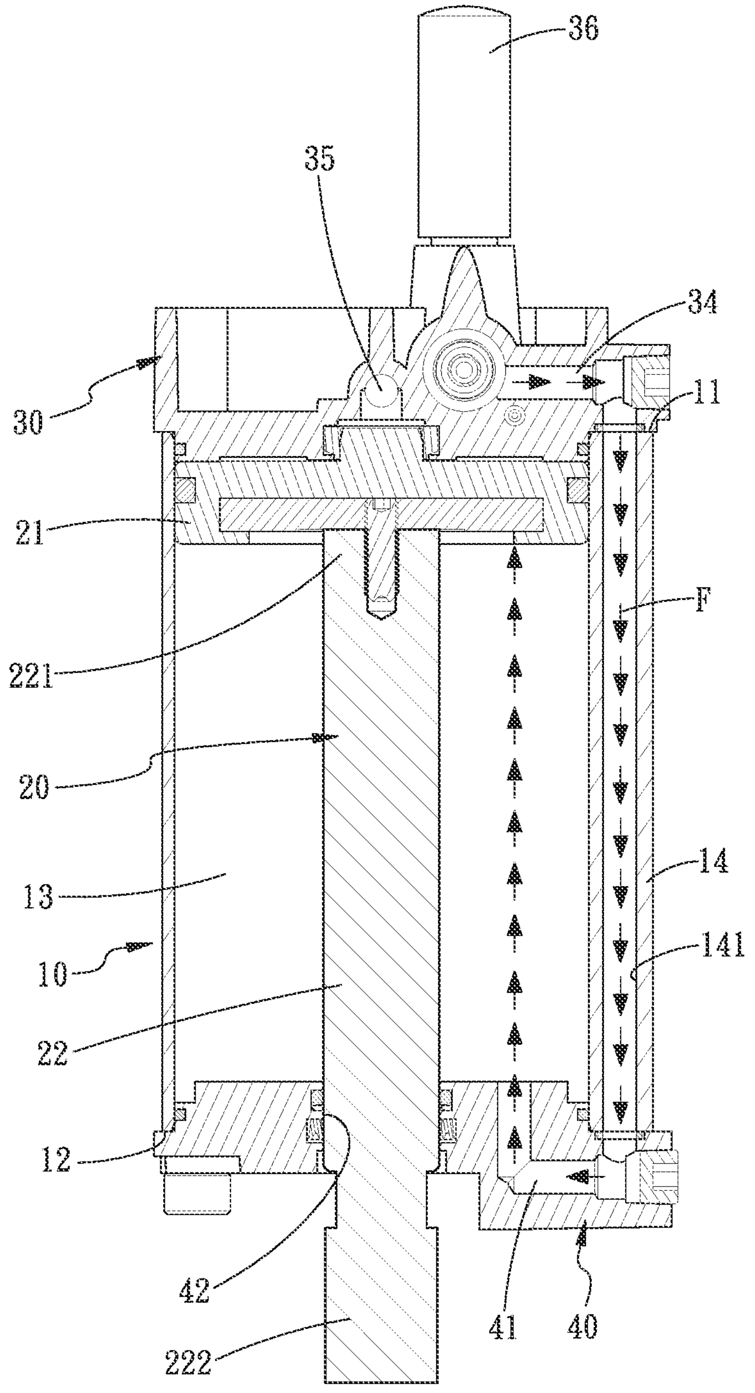
FIG. 5 is a cross-sectional view taken along line 5-5 in FIG. 1, illustrating the valve stem at the first position.
Figure 7:
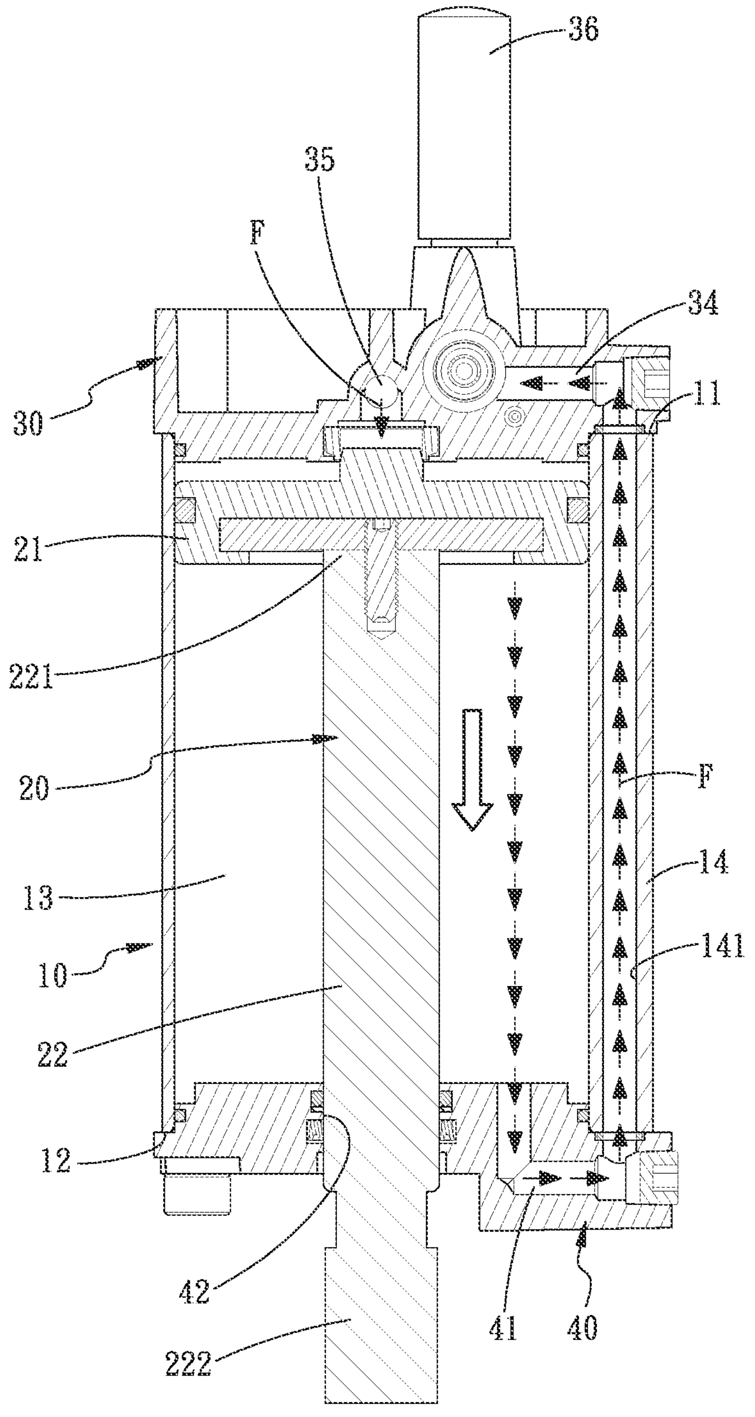
FIG. 7 is another schematic view of the present invention, illustrating the valve stem at the second position.

The top cover 30 is disposed on the first end 11 of the cylinder body 10. The top cover 30 comprises an inlet 31, two outlets 32, a movement bore 33, a first passage 34, and a second passage 35. The inlet 31 and the two outlets 32 are in communication with the movement bore 33, respectively. A fluid F enters the chamber 13 through the inlet 31. In the embodiment, the fluid F is a gas. The inlet 31 and the two outlets 32 convexly disposed on the top part of the top cover 30 at intervals, and the inlet 31 is arranged between the two outlets 32. The movement bore 33, the first passage 34, and the second passage 35 are disposed between the top part and the bottom part of the top cover 30. The flow channel 141 is in communication with the first passage 34, and the first passage 34 is not in direct communication with the chamber 13. A through hole 351 passes through the second passage 35 to be in communication with the chamber 13, as shown by FIG. 2, FIG. 5, and FIG. 7.

A plurality of operation channels are concavely disposed at intervals on a periphery of an inner diameter of the movement bore 33, and in positional alignment and communication with the inlet 31, the two outlets 32, the first passage 34, and the second passage 35. Therein, the operation channels include an input channel 331, a first discharge channel 332, a second discharge channel 333, a first communication channel 334, and a second communication channel 335, wherein the input channel 331 is in communication with the inlet 31, the first discharge channel 332 and the second discharge channel 333 are in communication with the two outlets 32, respectively, the first communication channel 334 is in communication with the first passage 34, the second communication channel 335 is in communication with the second passage 35, the input channel 331 is disposed between the first communication channel 334 and the second communication channel 335, the first communication channel 334 is disposed between the input channel 331 and the first discharge channel 332, and the second communication channel 335 is disposed between the input channel 331 and the second discharge channel 333, as shown by FIG. 3.

Also, one end of the two outlets 32 are in communication with a silencer 36, respectively, such that the two silencers 36 provide sound reducing effects when the fluid F is being discharged, as shown by FIG. 1.

The bottom cover 40 is disposed on the second end 12 of the cylinder body 10. The bottom cover 40 comprises a third passage 41. The flow channel 141 is in communication with the first passage 34 and the third passage 41. The third passage 41 is in communication with the flow channel 141 and the chamber 13. Therein, a cylinder bore 42 passes through the bottom cover 40 to be in communication with the chamber 13. The second connection end 222 of the shaft body 22 is allowed to protrude out from the cylinder bore 42 of the bottom cover 40, as shown by FIG. 5 and FIG. 7.

The solenoid valve 50 is disposed on the top cover 30 and comprises an electronic control unit 51 and a valve stem 52. The electronic control unit 51 is connected with the outer periphery of the top cover 30. The valve stem 52 is movably disposed in the movement bore 33. The electronic control unit 51 controls the valve stem 52 to reciprocate between a first position and a second position. In the embodiment, the solenoid valve 50 is a pneumatic solenoid valve.

A plurality of grooves 521 and a plurality of through grooves 522 are concavely disposed on the outer periphery of the valve stem 52 at intervals, wherein grooves 521 are arranged on two sides of each through groove 522 at intervals, and each groove 521 is mounted with a seal ring 523. In the embodiment, five grooves 521 and three through grooves 522 are included. The through grooves 522 are disposed at the middle section of the valve stem 52 at intervals, and the depth of each through groove 522 is larger than the depth of each groove 521, as shown by FIG. 3 and FIG. 6.

Figure 4:
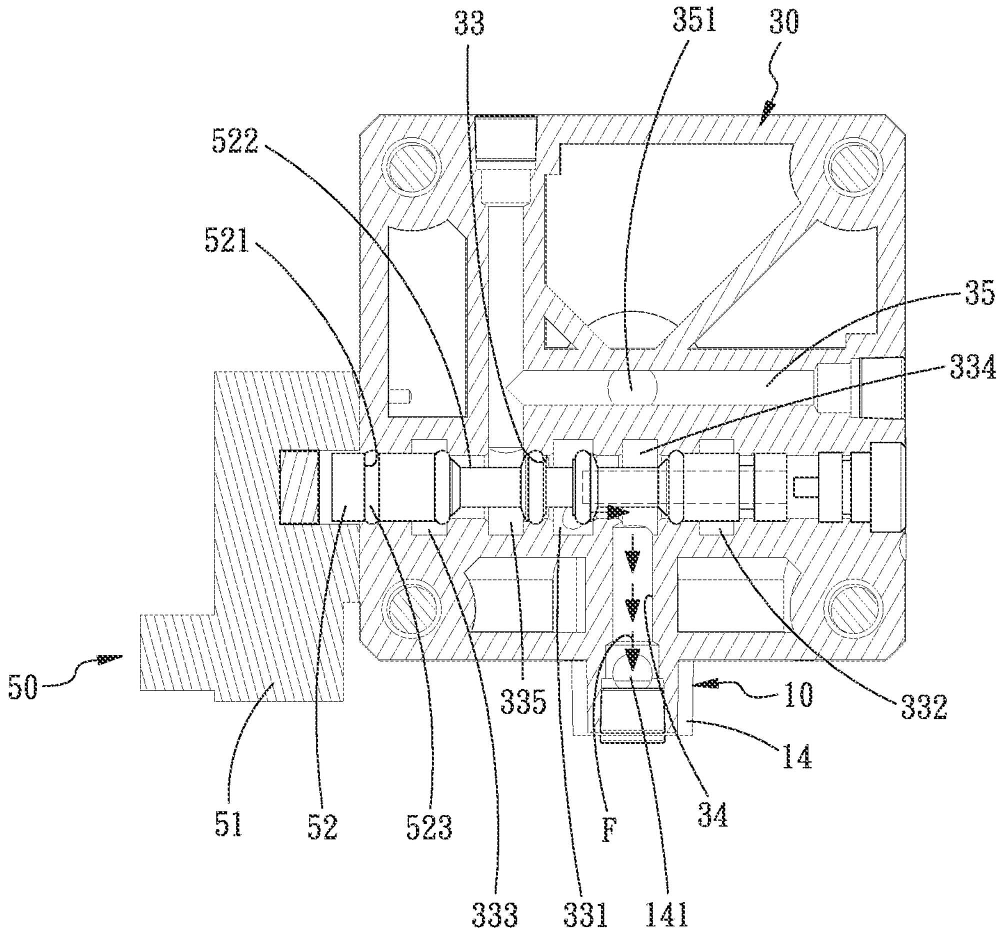
FIG. 4 is a cross-sectional view taken along line 4-4 in FIG. 1, illustrating the valve stem at the first position.

Referring to FIG. 3 to FIG. 5, when the electronic control unit 51 controls the valve stem 52 to be located at the first position, the inlet 31 is in communication with one of the through grooves 522, the input channel 331, the first communication channel 334, the first passage 34, the third passage 41, and the chamber 13. The fluid F enters the input channel 331 in the movement bore 33 through the inlet 31. Because one side of the input channel 331 is blocked by the seal ring 523 mounted around the valve stem 52, the fluid F is prevented from flowing toward the second discharge channel 333, and therefore flows to the first communication channel 334 to the first passage 34. The fluid F flows through the first passage 34 to the third passage 41 and enters the chamber 13, so as to push the piston assembly 20 toward the top cover 30.

Figure 6:
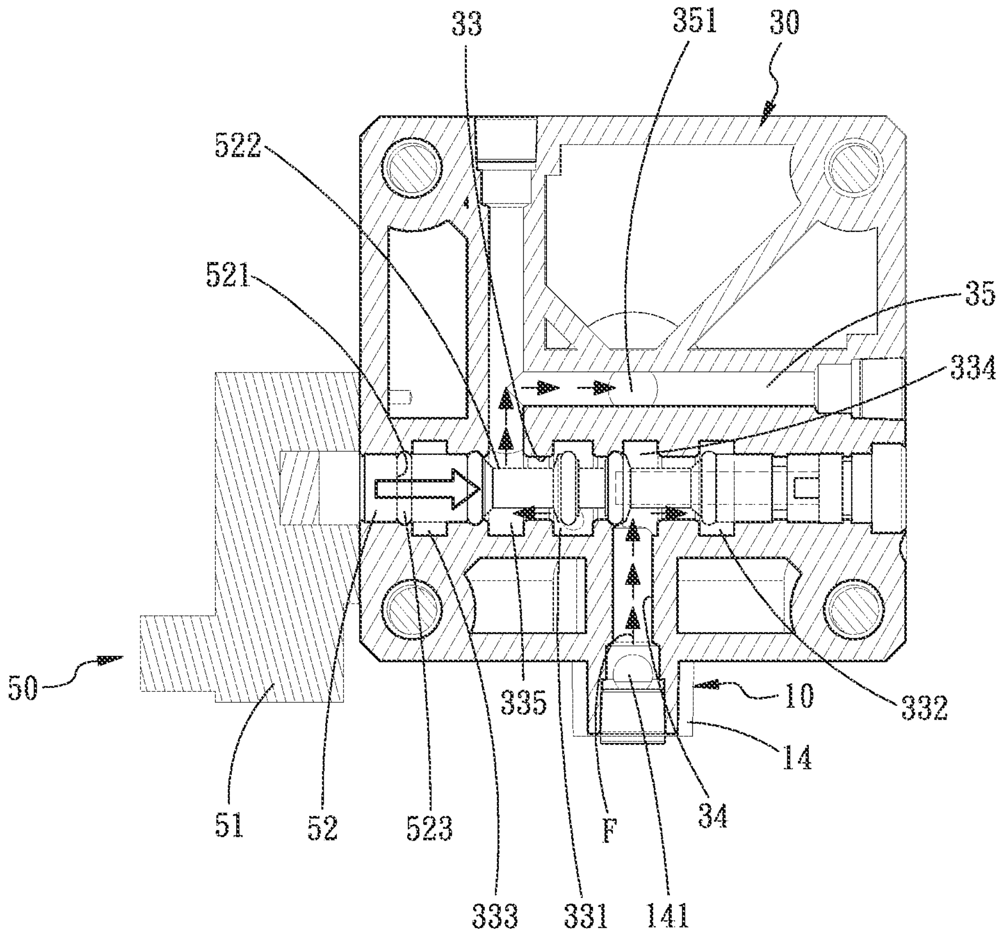
FIG. 6 is a schematic view of the present invention, illustrating the valve stem at the second position.

Referring to FIG. 6 to FIG. 7, when the electronic control unit 51 controls the valve stem 52 to move to the second position, the inlet 31 is in communication with two of the through grooves 522, the input channel 331, the second communication channel 335, the second passage 35, and the chamber 13. The fluid F flows to the input channel 331 in the movement bore 33 through the inlet 31. Because another side of the input channel 331 is blocked by the seal ring 523 mounted around the valve stem 52, the fluid F flows to the second communication channel 335 to the second passage 35. The fluid F enters the chamber 13 through the through hole 351 of the second passage 35, so as to push the piston assembly 20 away from the top cover 30, and the fluid F originally in the chamber 13 enters the first discharge channel 332 through the third passage 41 and the first passage 34, such that the fluid F is outputted from the outlet 32.

With the foregoing configuration, the present invention achieves following effects.

With the solenoid valve 50 combined with the top cover 30, the solenoid valve 50 does not need to be independently installed during actual usage, and the volume of the power cylinder is not increased, allowing the user to arrange the proper installation space.

The power cylinder of the present invention is structurally simple, saving the need of additional time for installing the solenoid valve 50, thereby reducing the inconvenience of usage Although particular embodiments of the invention have been described in detail for purposes of illustration, various modifications and enhancements may be made without departing from the scope of the invention. Accordingly, the invention is not to be limited except as by the appended claims.

What is claimed is:

1. A power cylinder with embedded solenoid valve, comprising:

a cylinder body having a first end and an opposite second end, the cylinder body comprising a chamber therein;

a piston assembly movably disposed in the chamber of the cylinder body, wherein the piston assembly comprises a piston and a shaft body; the piston is arranged in adjacent to the first end and connected with one end of the shaft body; another end of the shaft body protrudes out of the second end;

a top cover disposed on the first end of the cylinder body, the top cover having an inlet, two outlets, a movement bore, a first passage, and a second passage, the inlet and the two outlets being axially disposed, and an arrangement direction of the inlet and the two outlets being the same as an actuation direction of the shaft body, the inlet and the two outlets being in communication with the movement bore, respectively, so that a fluid enters the chamber through the inlet, wherein a plurality of operation channels are concavely disposed at intervals on a periphery of an inner diameter of the movement bore, the operation channels include an input channel, a first discharge channel, a second discharge channel, a first communication channel, and a second communication channel; the input channel is in communication with the inlet, the first discharge channel and the second discharge channel are in communication with the two outlets, respectively, the first communication channel is in communication with the first passage, and the second communication channel is in communication with the second passage, the input channel is disposed between the first communication channel and the second communication channel, the first communication channel is disposed between the input channel and the first discharge channel, and the second communication channel is disposed between the input channel and the second discharge channel, respectively, and the second passage is in communication with the chamber, wherein the first passage is not in direct communication with the chamber; a through hole passes through the second passage, and the through hole is in communication with the chamber;

a bottom cover disposed on the second end of the cylinder body, the bottom cover comprising a third passage in communication with the first passage and the chamber; and a solenoid valve disposed on the top cover, the solenoid valve comprising an electronic control unit and a valve stem, the valve stem disposed in the movement bore, wherein a plurality of grooves and a plurality of through grooves are concavely disposed on an outer periphery of the valve stem at intervals, the grooves are arranged on two sides of each of the through grooves at intervals, each of the grooves is mounted with a seal ring, and a depth of each of the through grooves is larger than a depth of each of the grooves, the electronic control unit controlling the valve stem to reciprocate between a first position and a second position, wherein when the electronic control unit controls the valve stem to be located at the first position, the inlet is in communication with the input channel, the first communication channel, the first passage, the third passage, and the chamber, the fluid enters the input channel in the movement bore through the inlet, and because one side of the input channel is blocked by the seal ring mounted around the valve stem, the fluid is prevented from flowing toward the second discharge channel, and instead flows to the first communication channel to the first passage, the fluid flows through the first passage to the third passage and enters the chamber, so as to push the piston assembly toward the top cover; when the electronic control unit controls the valve stem to move to the second position, the inlet is in communication with the input channel, the second communication channel, the second passage, and the chamber; and one of the outlets is in communication with the first discharge channel, the first passage, the third passage, and the chamber, the fluid enters the input channel in the movement bore through the inlet, and because another side of the input channel is blocked by the seal ring mounted around the valve stem, the fluid flows to the second communication channel to the second passage, and the fluid enters the chamber through the through hole of the second passage, so as to push the piston of the piston assembly so as to drive the shaft body away from the top cover, and the fluid originally located in the chamber is outputted through the two outlets, via the third passage and the first passage, from the outlets.

2. The power cylinder with embedded solenoid valve of claim 1, wherein the cylinder body comprises a housing part convexly disposed on an outer lateral side thereof; the housing part comprises a flow channel passing therethrough, and the flow channel is in communication with the first passage and the third passage.

3. The power cylinder with embedded solenoid valve of claim 1, wherein one end of the two outlets are connected with a silencer, respectively.

* * * * *